United States Patent [19]
Schubart et al.

[11] Patent Number: 6,093,789
[45] Date of Patent: Jul. 25, 2000

[54] PROCESS FOR THE PREPARATION OF POLYMERS WITH REPEATING SUCCINYL UNITS USING CATALYSTS

[75] Inventors: Rüdiger Schubart, Gladbach, Germany; Richard Weider, Longmeadow, Mass.

[73] Assignee: Bayer Aktiengellschaft, Leverkusen, Germany

[21] Appl. No.: 09/277,779

[22] Filed: Mar. 29, 1999

[30] Foreign Application Priority Data

Apr. 3, 1998 [DE] Germany ............. 198 15 025

[51] Int. Cl.$^7$ .................................................. C08G 69/10
[52] U.S. Cl. ................. 528/328; 528/363; 528/486; 528/503; 525/419; 525/420
[58] Field of Search ................... 528/328, 363, 528/486, 503; 525/419, 420

[56] References Cited

U.S. PATENT DOCUMENTS

| | | | |
|---|---|---|---|
| 4,839,461 | 6/1989 | Boehmke | 528/363 |
| 5,142,062 | 8/1992 | Knebel et al. | 548/545 |
| 5,288,783 | 2/1994 | Wood | 525/418 |
| 5,296,578 | 3/1994 | Koskan et al. | 528/363 |
| 5,371,180 | 12/1994 | Groth et al. | 528/363 |
| 5,478,918 | 12/1995 | Koskan et al. | 528/363 |
| 5,543,490 | 8/1996 | Groth et al. | 528/328 |
| 5,747,635 | 5/1998 | Kroner et al. | 528/328 |
| 5,919,894 | 7/1999 | Schubart | 528/328 |

FOREIGN PATENT DOCUMENTS

| | | |
|---|---|---|
| 0 593 187 | 4/1994 | European Pat. Off. . |
| 95/02007 | 1/1995 | WIPO . |

OTHER PUBLICATIONS

Ullmann's Encyclopedia of Industrial Chemistry (month unavailable) 1982, vol. B2, Stirring, Chapter 25–pp. 1–33, Marko Zlokarnik, Helmut Judat, Bayer AG. Leverkusen, Federal Republic of Germany.

Ullmann's Encyclopedia of Industrial Chemistry (month unavailable) 198s, vol. B4, Continuous Mixing of Fluids, pp. 561–586, Hans–Jürgen Henzler, Bayer AG, Wuppertal, Federal Republic of Germany.

Perry's Chemical Engineers' Handbook, 6th Edition (month unavailable) 1984, pp. 21–61, Stagewise Equipment: Mixer–Settlers.

M.H. Pahl and Edgar Muschelknautz, Ensatz und Auslegung statischer Mischer, Chem. Ing. Tech. 51, (month unavailable) 1979, pp. 347–364.

Manfred H. Pahl and Edgar Muschelknautz, Statische Mischer und ihre Anwendung, Chem. Ing. Tech, 52 (month unavailable) 1980, Nr. 4 S. 285–291.

*Primary Examiner*—Duc Truong
*Attorney, Agent, or Firm*—Joseph C. Gil; Diderico van Eyl

[57] ABSTRACT

The invention relates to a process for preparing polymers having repeating succinyl units, especially polysuccinimide and polyaspartic acid, with increased $M_W$ values at non-increased, moderate synthesis temperatures and at the same time without increased polycondensation times, using maleic anhydride and ammonium carbonate plus a catalyst.

16 Claims, No Drawings

PROCESS FOR THE PREPARATION OF POLYMERS WITH REPEATING SUCCINYL UNITS USING CATALYSTS

FIELD OF THE INVENTION

The invention relates to a process for preparing polymers having repeating succinyl units, in particular of polyaspartic acid (PAA) and polysuccinimide (PSI).

BACKGROUND OF THE INVENTION

The preparation and use of polysuccinimide and polyaspartic acid and its derivatives have been the subject of numerous publications and patents for a long time.

U.S. Pat. No. 4,839,461 (=EP-A 0 256 366) describes the preparation of polyaspartic acid from maleic anhydride, water and ammonia. This involves maleic anhydride being reacted in an aqueous medium, with the addition of concentrated ammonia solution, and then polymerized. During this polymerization, the mass becomes first highly viscous and then solid-porous, which requires handling which is expensive in terms of process technology.

U.S. Pat. No. 5,296,578 describes the preparation of PSI from maleic anhydride, water and ammonia. Maleic anhydride is hydrolysed in water to give maleic acid and this is then converted into the ammonium salt with concentrated ammonia solution. The water is evaporated off from the solution in a stirred reactor and the monoammonium salt is then polymerized in bulk at temperatures above 170° C. to give PSI. In this process, the mass is converted into solid PSI in the course of several hours via highly viscous phase states, and this is then hydrolysed to give PAA.

U.S. Pat. No. 5,288,783 describes the preparation of PAA from maleic acid or fumaric acid, water and ammonia. This involves maleic anhydride being mixed with water in a stirred tank and converted into maleic acid, while cooling. The maleic acid monoammonium salt is prepared by addition of concentrated ammonia solution. The water contained in the mixture is then evaporated off and the dry monoammonium salt is polymerized at temperatures from 190 to 350° C. An alternative proposal is to process further the monoammonium salt present in aqueous solution to PSI by extrusion at temperatures from 160 to 200° C. The PSI prepared by one of the two process routes is then hydrolysed to PAA under alkaline conditions.

EP-A 593 187 describes the preparation of PSI by thermal polymerization of maleamic acid at temperatures from 160 to 330° C. over a reaction time of 2 minutes to 6 hours. Reference is also made to polycondensation in a solvent using condensation auxiliaries.

DE-A 4 023 463 (U.S. Pat. No. 5,142,062) describes a process for the preparation of poly-succinimide in the presence of phosphoric acids. DE-A 4 221 875 (=WO 94/01486) describes the preparation of so-called modified polyaspartic acids by poly-condensation of aspartic acid with other compounds, if appropriate in the presence of phosphoric acids or derivatives thereof. It is known from WO 95/02007 to prepare polymers of aspartic acid by heating maleic anhydride and acid derivatives of ammonia. Phosphoric acid, inter alia, is mentioned as the acid. Of the corresponding salts, however, only diammonium hydrogen phosphate and monoammonium dihydrogen phosphate are mentioned. EP-A 604 813 (DE-A 4 244 031) discloses a process for the preparation of polysuccinimide and polyaspartic acid from maleamic acid in which maleic anhydride and ammonia are reacted to give maleamic acid and the maleamic acid is subjected to polymerization, which can be carried out in the presence of phosphoric acids and polyphosphoric salts.

WO 96/34908 describes a process for preparing polymers having repeating succinyl units, especially polysuccinimide and polyaspartic acid, using triammonium salts, especially triammonium phosphates. According to Example 1, at 180° C. and with a reaction time of 2 h 45 min, 95 g of polysuccinimide (PSI) having a molecular weight of 2580 are obtained; in Example 2, at 240° C. and with a reaction time of 2 h 50 min, 99 g of PSI of MW 2550 are obtained; in Example 3, at 240° C. and in 4 h 40 min, 88 g of PSI of MW 2096 are obtained, and in Example 4 at temperatures of 200° C. over 5 h, 104 g of PSI of MW 5858 are obtained. In Example 5, under the same conditions as in Example 4 but with the addition of 10 g of diammonium phosphate, PSI of MW 4566 is obtained.

DE 4 322 410, moreover, shows the route to the synthesis of PSI and PAS via the reaction of maleic anhydride with ammonium carbonate, with heating.

A disadvantage of the known processes is that depending on reaction conditions, such as reaction time and temperature, they lead to very different PSI with varying average molecular weights and, consequently, to products of unsatisfactory degradability.

The present invention is therefore based on the object of providing an improved process for the preparation of polymers with repeating succinyl units, in particular of polysuccinimide and polyaspartic acid, having increased $M_W$ values at non-elevated, moderate synthesis temperatures and at the same time without increased polycondensation times.

SUMMARY OF THE INVENTION

This object has been achieved in that the derivative of an optionally substituted 1,4-butanedicarboxylic acid or butenedicarboxylic acid, preferably its anhydrides, particularly preferably maleic anhydride, is mixed with ammonium carbonate in the melt, together if desired with a catalyst at from 60 to 100° C., preferably in the presence of water of crystallization, and the temperature is raised to at least 120 to 145° C. for the initial reaction and for the polymerization the temperature is raised to up to 300° C., preferably 250° C. and, particularly preferably, to from 160 to 200° C., and at the same time the water of reaction is removed.

In one preferred embodiment, the catalyst is not added until after the initial reaction at about 130° C.

DETAILED DESCRIPTION OF THE INVENTION

For the purposes of the present invention, the term polycondensation herein does not imply any restriction to a particular process for preparing substances of relatively high molecular weight. Likewise, polymerizations are meant in the widest sense.

The polymers prepared according to the invention preferably contain repeating succinyl units having at least one of the following structures

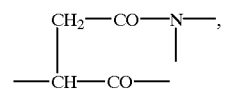

preferably

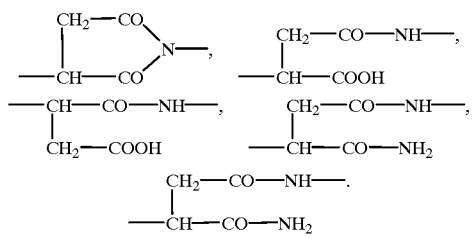

Depending on the embodiment, they can also contain iminodisuccinate units, preferably at least one of the following structures:

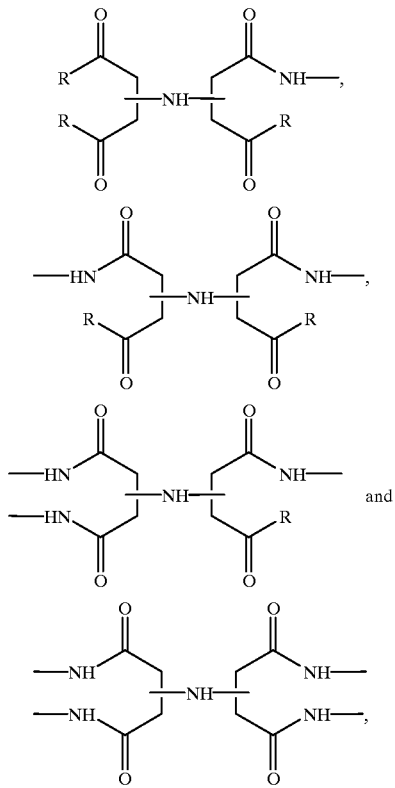

in which

R in each case represents OH, O⁻NH$_4^+$ or NH$_2$.

The iminodisuccinate units can be present in the polymer in random distribution or, preferably, as an end group. Where appropriate, the iminodisuccinate unit is present to the extent of at least 0.1 mol %, based on the sum of all the repeating units. The molar ratio of the iminodisuccinate units incorporated in the polymer to the sum of all the monomer units incorporated in the polymer is preferably 0.1 mol % to 99 mol %, preferably 1 mol % to 50 mol %, particularly preferably 2 mol % to 25 mol %.

The polymers can additionally contain further repeating units by a suitable reaction procedure and choice of the starting materials, for example a) malic acid units of the formula

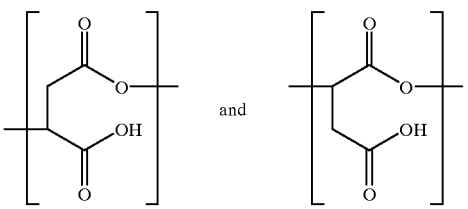

b) maleic acid and fumaric acid units of the formula

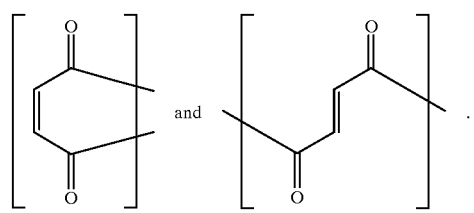

In a preferred embodiment, maleic anhydride, maleic acid, maleic acid derivatives, for example maleic esters and maleic acid monoesters, fumaric acid or fumaric acid derivatives are employed. Maleic acid and maleic anhydride are particularly preferred. Instead of maleic anhydride and ammonium carbonate it is also possible directly to employ maleamide or maleic acid ammonium salt.

Preferred maleic esters or maleic monoesters are the methyl or ethyl esters.

In a preferred embodiment, in this synthesis process, ammonium carbonate or ammonium hydrogen carbonate is reacted with the optionally substituted dicarboxylic acid in the presence of catalysts. In this case it is particularly preferable if from 0.45 to 0.8 mol of ammonium carbonate, in particular from 0.45 to 0.6 mol and, especially, from 0.45 to 0.55 mol, is used per mole of maleic anhydride or optionally substituted dicarboxylic acid or mixtures thereof, and a catalyst is used in an amount of from 0.01 to 20 g, preferably from 0.5 to 10 g and, with particular preference, from 1 to 5 g per mole of maleic anhydride.

In a very preferred embodiment of the invention, maleic anhydride is mixed with ammonium carbonate in a ratio of 1:0.5, preferably without solvents, and the two compounds are then melted together at about 60 to 100° C. in the presence of water of crystallization. Subsequently, the temperature of the mixture is raised to 115 to 145° C., preferably 120 to 140° C. and, with particular preference, 125 to 135° C., and the mixture is left at this temperature until the evolution of gas is at an end. The catalyst in the stated amount is then added and the temperature is raised to about 160 to 200° C. in order to achieve polycondensation, with the removal of water by means, for example, of distillation. Further water can, in particular, be stripped of by applying a vacuum.

The polymerization product obtained in accordance with the process of the invention has average molecular masses of from 1600 to 3800, preferably from 2000 to 3400, and, with particular preference, from 2100 to 3300.

The polymerization product obtained, which comprises polysuccinimide units, can be hydrolysed in a customary manner to give polyaspartic acid and its salts.

As the catalysts it is possible to use acids, especially those of phosphorus, i.e. phosphoric and polyphosphoric acids, phosphorous acid, phosphonic acids, phosphinic acids, sulphonic and sulphinic acids, or else acid-doped support materials such as aluminium oxide, various silicas, and titanium oxides. These support materials, however, can also be employed alone.

The effect of the catalyst on the polycondensation is evident from the table, on the basis of the amount of catalyst and the resultant change in the $M_W$ value.

Table 1 shows the results of the following reaction:

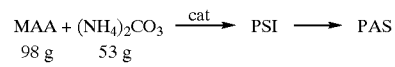

MAA + (NH$_4$)$_2$CO$_3$ $\xrightarrow{\text{cat}}$ PSI $\longrightarrow$ PAS
98 g    53 g

TABLE 1

| Batch SUD | without catalyst | H$_3$PO$_4$ | H$_3$PO$_3$ | C$_6$H$_5$P(O)(H)(OH) | C$_6$H$_5$P(O)(OH)$_2$ | Al$_2$O$_3$ | Methane-sulphonic acid | Heating phase | total reaction time including heating phase | °C. | °C. | °C. | Molecular mas $M_w$ |
|---|---|---|---|---|---|---|---|---|---|---|---|---|---|
| 4 | x | | | | | | | 2 h | 4 h | 160 | | | 1665 |
| 6 | x | | | | | | | 2 h | 4 h | | 200 | | 2260 |
| 8 | x | | | | | | | 2 h | 4 h | | | 240 | 3200 |
| 9 | | 1 g | | | | | | 2 h | 4 h | 160 | | | 1704 |
| 11 | | 1 g | | | | | | 2 h | 4 h | | 200 | | 2613 |
| 13 | | 1 g | | | | | | 2 h | 4 h | | | 240 | 3308 |
| 14 | | 5 g | | | | | | 2 h | 4 h | 160 | | | 1853 |
| 16 | | 5 g | | | | | | 2 h | 4 h | | 200 | | 2865 |
| 24 | | | 1 g | | | | | 2 h | 4 h | 160 | | | 2410 |
| 26 | | | 1 g | | | | | 2 h | 4 h | | 200 | | 3020 |
| 28 | | | 1 g | | | | | 2 h | 4 h | | | 240 | 3380 |
| 29 | | | 5 g | | | | | 2 h | 4 h | 160 | | | 2212 |
| 46 | | | | 1 g | | | | 2 h | 4 h | 160 | | | 2189 |
| 47 | | | | 1 g | | | | 2 h | 4 h | | 200 | | 2578 |
| 48 | | | | 5 g | | | | 2 h | 4 h | 160 | | | 2726 |
| 49 | | | | 5 g | | | | 2 h | 4 h | | 200 | | 2827 |
| 50 | | | | 10 g | | | | 2 h | 4 h | 160 | | | 2594 |
| 52 | | | | | 1 g | | | 2 h | 4 h | 160 | | | 2591 |
| 53 | | | | | 1 g | | | 2 h | 4 h | | 200 | | 2797 |
| 54 | | | | | 5 g | | | 2 h | 4 h | 160 | | | 2686 |
| 45 | | | | | | 10 g | | 2 h | 4 h | | 180 | | 2650 |
| 58 | | | | | | 20 g | | 2 h | 4 h | 160 | | | 2390 |
| 64 | | | | | | | 1 g | 2 h | 4 h | 160 | | | 2420 |
| 65 | | | | | | | 1 g | 2 h | 4 h | | 200 | | 2590 |
| 66 | | | | | | | 5 g | 2 h | 4 h | 160 | | | 2970 |
| 67 | | | | | | | 5 g | 2 h | 4 h | | 200 | | 3760 |

A further variant of the molecular weight influencing of the value $M_W$ consists in employing, rather than the components MAA and ammonium carbonate, the ammonium salt of maleic acid. According to the scheme—first of all without additional catalyst

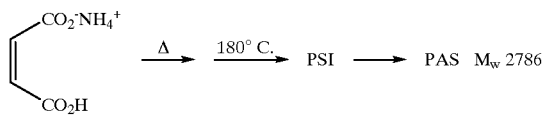

an $M_W$ value of 2786 is obtained. If methanesulphonic acid is added following the initial reaction and then condensation is carried out to completion, likewise at 180° C., the $M_W$ value is markedly higher, at $M_W$ 3050.

In a further variant, the monoamide of maleic acid is employed rather than the ammonium salt. In this case, under the same conditions as above, however, a different $M_W$ value of 2400 is obtained without a catalyst.

If, however, phosphorous acid or methanesulphonic acid is added after the initial reaction, $M_W$ likewise turns out to be markedly higher following the condensation at up to 180° C., with $M_W$ at 2970 and $M_W$ at 3120.

In this respect, the reaction scheme is the following:

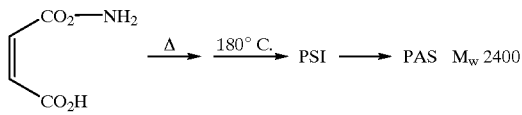

In the case of the monoamide of maleic acid, the gradual heating to ~120° C. and addition of the catalyst and then the continued heating to 180° C. for complete condensation can be reordered, and the catalyst can be added from the beginning.

The following processes and devices are particularly preferred in respect of further embodiment variants:

The starting materials can be employed individually or in mixtures, in bulk or in solution. In a preferred embodiment, maleic anhydride (MAA) is employed as a melt.

If appropriate, the reaction of the starting materials can be carried out in the presence of a solvent. Suitable solvents are water, lower alcohols, polar aprotic solvents, such as dimethylformamide, formamide and ureas, N-alkylpyrrolidone, sulpholane, acetone, dimethyl sulphoxide, polyalkylene glycols, polyalkylene glycol monoalkyl ethers and polyalkylene glycol dialkyl ethers. Supercritical gases, such as, for example, carbon dioxide and ammonia, are also suitable. Water and/or formamide is particularly suitable.

The thermal polymerization is in general carried out at temperatures between 100° C. and 300° C., preferably between 120° C. and 250° C., particularly preferably between 140° C. and 200° C. The residence time in this case is preferably between 1 second and 600 minutes, preferably between 5 seconds and 240 minutes, particularly preferably between 10 seconds and 150 minutes.

Another process for the preparation of the polymers according to the invention comprises the following steps:

a) The two starting materials are mixed with the catalyst and slowly brought to 120 to 145° C., if appropriate in the presence of a fluidizing agent and also if appropriate with the addition of a comonomer, and if appropriate by heating, during which they melt.

b) The two starting materials are mixed without a catalyst, if appropriate in the presence of a fluidizer and also if appropriate with addition of a comonomer, and are brought slowly to 120 to 145° C. by heating, during which they melt.

c) The reaction mixture obtained in situ from a) or b) is then mixed continuously or batchwise in an appropriate reactor at temperatures between 120 and 145° C., and in the case of b) is mixed with the appropriate amount of catalyst as well, and is brought to polycondensation by raising the temperature further. The condensation temperatures lie within a range from 145 to 300° C. Preference is given to 145 to 250° C. and particular preference to 145 to 200° C., with residence times of from 1 second to 600 minutes, with particular preference from 5 seconds to 240 minutes and, with very particular preference from 10 seconds to 150 minutes.

d) If appropriate, further MAA or further maleic acid and a base can be metered in at the end of the polymerization. Suitable bases are alkali metal and alkaline earth metal hydroxides or carbonates, such as, for example, sodium hydroxide solution, potassium hydroxide solution, sodium carbonate or potassium carbonate, ammonia and amines, such as triethanolamine, diethylamine, diethanolamine, alkylamines, etc.

A preferred embodiment of the general process described above comprises carrying out the reaction of the starting materials in the presence of a catalyst in the first reaction step essentially adiabatically and employing the heat of reaction thereby liberated to bring the reaction mixture together with the catalyst to the polymerization temperature, and to subject the N-containing low-molecular-weight derivative in the second reaction step to at least partial polymerization to give a polymer with repeating succinyl units.

Suitable devices for sufficiently rapid mixing of two streams of liquid are known from many literature sources and patents (for example Ullmann: Encyclopedia of Industrial Chemistry, 1982, Volume B2, Chapter 25; Volume B4, 561–586; Perry's Chemical Engineers' Handbook, 6th Edition (1984), McGraw-Hill, N.Y., 21–61; M. H. Pohl, E. Muschelknautz, Chem. Ing. Tech. 51 (1979), 347–364; Chem. Ing. Tech. 52 (1980), 295–291).

Preferred devices for rapid mixing of the streams of starting material are all types of jet mixers, static mixers and dynamic mixers. Particularly preferred devices for rapid mixing of the starting materials and for starting the exothermic reaction are jet mixers, further advantages of which lie in hermetic tightness, variably adjustable mixing energy and global plug flow characteristics.

In a preferred embodiment, the starting materials are mixed in a rapid-mixing apparatus of the abovementioned construction when carrying out the first reaction step, in order to avoid undesirable secondary reactions and the exothermic formation of the intermediates is carried out in parallel or thereafter. The heat thereby liberated is essentially stored in the starting material/intermediate mixture. The reaction mixture is thereby brought to the polymerization temperature, and where appropriate all or at least some of the organic solvent or the water and the water formed during the reaction are evaporated off. In a particularly preferred embodiment, mixing is carried out within less than 2 seconds and the exothermic formation of the intermediates within less than 60 seconds. The reaction mixture emerging from the first reaction stage is then polymerized in a suitable apparatus.

All apparatuses which, with a narrow residence time distribution of the viscous-liquid phase, allow the necessary minimum residence time for the polymerization and at the same time at least partial evaporation of the solvent, in particular the water, and of the water formed during the reaction are suitable in principle for the thermal polymerization.

Preferred devices for the thermal polymerization are thus all apparatuses which have a defined residence time with a narrow residence time distribution for the solid or highly viscous liquid phase and at the same time allow good temperature control by at least partial evaporation of the solvent (organic solvent and/or water) and/or of the water of reaction formed in the polymerization. Such preferred devices can be, for example, a) Delay tubes
b) High-viscosity reactors (for example screw, List reactor, Buss reactor)
c) Dryers (for example paddle dryer, spray dryer, plate dryer, belt dryer)
d) Stirred tank cascade
e) Thin film evaporator
f) Multi-phase helical tube reactors (DT 1 667 051)

In another variant of the process of the invention, one starting material component can be metered in at several points along a tube or multi-phase helical tube reactor in a suitable manner, so that an optimum temperature profile can be achieved. This avoids the occurrence of temperatures which are too high, which may lead to product damage. The number of additional metering points (without the metering into the mixing nozzle at the tube or multi-phase helical tube reactor intake) is preferably in the region of up to 10. The method of feed is chosen such that good mixing with the reaction solution takes place.

The metering points also serve to feed in the comonomers (C) which are optionally to be added. C is understood as meaning, for example, amino acids, such as glycine etc.

At the same time, the last metering point, which is shortly before the reactor outlet, can be used to add one of the abovementioned bases and if appropriate further starting material A in order to achieve grafting of the polymer with imidodisuccinate units.

The starting materials can be mixed at temperatures between 0° C. and 200° C., depending on the starting materials used. The exothermic adiabatic reaction of the first reaction step then provides sufficient heat, so that the second reaction step can then take place at 100 to 350° C., preferably at 120 to 260° C. and particularly preferably at 140 to 240° C., depending on the nature and concentration of the starting materials used. The temperature is advantageously adjusted via the pressure in the reactor and the flow rates of the starting materials (A, B) added, and also by the content of organic solvent and/or water. Cooling and heating media can also be employed to assist the temperature control during the reaction. Product-starting material regions with different temperatures furthermore can be brought into contact directly or indirectly in the reaction system for the purpose of heat exchange.

The residence times of the abovementioned starting materials in the previously described reactor system are up to 600 minutes. Residence times of up to 180 minutes are preferred. Residence times which decrease with increasing temperature are particularly preferred. The residence time in the reactor system is preferably chosen such that practically complete conversion of starting material A, which is employed in less than the molar amount, preferably MAA, is ensured. For practically complete polymerization, it may be necessary for the monomer and oligomer mixture already obtained shortly after mixing in the first reaction zone, particularly preferably in a tube reactor, to be reacted in another device proposed above, preferably a high-viscosity reactor. However, such a high-viscosity reactor can particularly preferably be dispensed with and complete polymerization can take place in just a delay tube, preferably in a multi-phase helical tube. The resulting reaction products are hot solutions or solvent-containing or water-containing melts, depending on the water and solvent content, because of the reaction enthalpy liberated. The reaction enthalpy can be largely utilized in the reactor. Optimum heat control is thereby achieved with low investment and operating costs of a chemical engineering plant, leading to a high profitability.

If the oligomer-containing melts are used in a high-viscosity reactor, in a preferred reaction procedure the rate of reaction can be considerably increased, in contrast to the direct synthesis from the intermediate maleic acid diammonium salt or maleamic acid ammonium salt which is likewise possible, in such a device owing to the viscous mass which is already preheated and partially depleted of solvents by evaporation because of the heat of reaction liberated. The residence time is lowered considerably, compared with the prior art, by this procedure.

The process can be carried out continuously or discontinuously. Preferred reactors are high-viscosity reactors, for example screw, List and Buss reactor.

The primary polymer products can first be powdered and then washed out with water, in which case the polysuccinimide remains and can be hydrolysed, for example, in the customary manner to give polyaspartic acid or to give salts, for example sodium polyaspartic acid.

However, the primary polymerization products can also be converted into a PAA-containing copolymer salt by reaction with a base, if appropriate in the presence of water. This conversion of PSI-containing copolymers into PAA-containing copolymers is effected by hydrolysis in a suitable device. A pH of between 5 and 14 is preferably suitable here. In a particularly preferred form, a pH of 7 to 12 is chosen, in particular by addition of a base. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like. The hydrolysis of the PSI can thus take place partially or fully.

Low molecular weight fractions (in particular catalyst salts) can be separated off from this solution by customary membrane technology of the kind used for seawater desalination. However, they can also remain in the product.

The temperature during the hydrolysis is suitably in a range including up to the boiling point of the suspension or solution containing succinyl groups and preferably 20 to 150° C. If appropriate, the hydrolysis is carried out under pressure. If appropriate, the hydrolysis is carried out with the addition of another monoethylenically unsaturated carboxylic acid derivative. Examples of suitable derivatives are maleic anhydride, maleic acid, citraconic acid, itaconic acid, aconitic acid, acrylic acid and fumaric acid.

Addition of the amino groups of the N-terminal end of the polymer molecule onto the monoethylenically unsaturated carboxylic acid derivative present in salt form can take place under the basic conditions of the hydrolysis.

Depending on the polymerization conditions described above, the primary polymerization products can also have ethylenically unsaturated end groups. It may therefore be expedient optionally to add aminocarboxylic acids as well, for example glycine, aspartic acid, lysine, glutamic acid and the like, to the reaction mixture during the basic hydrolysis. Grafting of the polymer end groups is achieved by this measure.

The polymeric free acids can also be liberated from the salts, however, by continuous or discontinuous ion exchanger treatment.

The polymers prepared according to the invention are distinguished by an improved calcium bonding capacity. They exhibit, furthermore, complexing properties with respect to heavy metals, such as, for example, copper, iron and the like. They can be used as an additive in low-phosphate and phosphate-free detergents and cleaning agents. The polymers are builders for detergents and have the effect of reducing encrustation and greying on washed textile goods during the washing operation.

The polyaspartic acids prepared according to the invention furthermore inhibit and delay the precipitation of calcium carbonate, calcium sulphate and calcium phosphate from aqueous solutions, and are therefore suitable as water treatment agents. They can be added to the water in cooling circulations, evaporators or seawater desalination plants. They can be employed as agents which prevent deposits during evaporation of sugar juice.

On the basis of their complexing property with respect to heavy metals, the polymers can also be used as stabilizers for bleaching agents such as hydrogen peroxide in bleaching processes.

The invention is further described in the following illustrative examples. All percentages are by weight, unless otherwise noted.

EXAMPLES

The primary polymerization products were characterized by means of elemental analysis. In this, in addition to carbon and hydrogen, three different types of nitrogen were also determined. The analysis distinguished between ionically bonded nitrogen (ammonium ions), hydrolytically sensitive nitrogen (for example amide or imide nitrogen) and "non-hydrolysable" nitrogen (amine nitrogen). In this way, the optimum hydrolysis necessary for an improved activity was monitored.

The polymers according to the invention obtained after the hydrolysis were analysed with the aid of $^1$H-NMR and $^{13}$C-NMR both in the salt form and after conversion into the free acid. The imidodisuccinic acid units were identified with the aid of the chemical shifts of $\delta_1=3.8$ ppm ($^1$H-NMR) and $\delta_2=55.5$ ppm ($^{13}$C-NMR) for the CH groups and of $\delta_3=2.7$ ppm ($^1$H-NMR) and $\delta_4=36.7$ ppm ($^{13}$C-NMR) for the $CH_2$ groups.

The residual monomer content was determined by HPLC and the polymer distribution by GPC against polyacrylates or polyaspartic acids from Sigma as a standard.

Example 1

98 g of maleic anhydride and 53 g of ammonium carbonate were heated to 160° C. under nitrogen over the course of 2 hours. This temperature was maintained for one hour. Then further water of reaction was removed by application of a vacuum. the mixture was subsequently cooled, comminuted optionally with water in a glass beaker using a mixer, filtered with suction, washed and dried in vacuo. 94 g of beige PSI were obtained. The molecular weight was $M_W$ 1665.

All further examples according to Table 1 were performed analogously, with the amount of catalyst being added in each case at about 130° C. and then the mixture being heated to 160, 180, 200 or 240° C., respectively, and the polycondensation being completed at this temperature by subsequent reaction for two hours. The total heating time was therefore 4 hours (2 hours for the heating-up phase and 2 hours more for the reaction phase).

Example 2

133 g of maleic acid monoammonium salt are heated to 180° C. under $N_2$ over the course of 3.75 hours. This temperature is maintained for one hour, then a vacuum is applied for one hour and the mixture is cooled under vacuum. The product is discharged and pulverized. 90 g of PSI are obtained, having an $M_w$ of 2786.

Example 3

92.5 g of maleic acid monoammonium salt are first of all heated to 120° C. over the course of 1 hour, then 4 g of phosphorous acid (75%) in 100 ml of water are added and the temperature is raised to 180° C. over the course of 2.75 hours. It is maintained at 180° C. for one hour, then the mixture is held for one hour in vacuo at up to 180° C., cooled in vacuo, discharged and pulverized. 67 g of pale powder are obtained, having an $M_w$ of 3050.

Example 4

62 g of maleic monoamide are heated to 180° C. over the course of 2 hours. The mixture is held at 180° C. for one hour, thorough condensation is carried out in vacuo for one hour at up to 180° C., and the mixture is cooled in vacuo, discharged and pulverized. 48 g of pale product are obtained, having an $M_W$ of 2400.

Example 5

80 g of maleic monoamide are heated to 180° C. with 4 g of 75% phosphorous acid in 100 ml of water over the course of 2 hours, with the water of condensation being distilled off. The mixture is held at 180° C. for 1 hour, subjected to post-condensation in vacuo at 180° C. for one hour, cooled in vacuo, discharged and pulverized. 62 g of pale product are obtained, having an $M_w$ of 2970.

Following the same procedure but with methanesulphonic acid gives an $M_w$ of 3120.

It will be understood that the specification and examples are illustrative but not limitative of the present invention and that other embodiments within the spirit and scope of the invention will suggest themselves to those skilled in the art.

What is claimed is:

1. A process for preparing a polymer having repeating succinyl units comprising:
   (a) forming a mixture from (i) a derivative of an optionally substituted dicarboxylic acid component comprising a dicarboxylic acid compound selected from the group consisting of 1,4-butanedicarboxylic acid and butenedicarboxylic acid, (ii) a carbonate component comprising a carbonate selected from the group consisting of ammonium carbonate and ammonium hydrogen carbonate, and (iii) a catalyst component, wherein the mixture is placed at a temperature ranging from 60 to 100° C. to form a melt; and
   (b) raising the temperature of the melt to a temperature ranging from 120 to 145° C., wherein an initial reaction occurs,
   (c) subjecting the melt to polymerization, wherein the temperature is raised to up to 300° C. and removing water from the melt.

2. The process of claim 1, wherein the derivative comprises a derivative based on an optionally-substituted butenedicarboxylic acid.

3. A process according to claim 1, wherein the derivative of an optionally substituted dicarboxylic acid component is mixed with ammonium carbonate or ammonium hydrogen carbonate in the presence of water of crystallization.

4. A process according to claim 1, wherein the optionally substituted dicarboxylic acid component includes a compound selected from the group consisting of maleic acid, maleic anhydride, maleic esters, maleic monoesters, maleamide, maleic monoamide, maleic acid ammonium salt and fumaric acid.

5. A process according to claim 1, wherein the catalyst component includes a catalyst selected from the group consisting of phosphoric acid, phosphorous acid, aluminium oxide, methanesulphonic acid, phenylphosphonic acid and phenylphosphonous acid.

6. A process according to claim 1, wherein the amount of catalyst is from 0.01 to 20 g per mole of maleic anhydride.

7. A process according to claim 1, wherein the polymer comprises a polysuccinimide having an average molecular weight $M_W$ of from 1600 to 3800.

8. A process according to claim 1, wherein the polymer having repeating succinyl units comprises polyaspartic acid.

9. A process for preparing a polymer having repeating succinyl units comprising:
(a) forming a mixture from (i) a derivative of an optionally substituted dicarboxylic acid component comprising a dicarboxylic acid compound selected from the group consisting of 1,4-butanedicarboxylic acid and butenedicarboxylic acid, and (ii) a carbonate component comprising a carbonate selected from the group consisting of ammonium carbonate and ammonium hydrogen carbonate to form a melt; and
(b) raising the temperature of the melt to a temperature ranging from 120 to 145° C., wherein an initial reaction occurs,
(c) adding a catalyst component to the melt to subjecting the melt to polymerization, wherein the temperature is raised to up to 300° C. and removing water from the melt.

10. A process according to claim 9, wherein the catalyst is added after the initial reaction at 130° C.

11. A process according to claim 9, wherein the derivative of an optionally substituted dicarboxylic acid component is mixed with ammonium carbonate or ammonium hydrogen carbonate in the presence of water of crystallization.

12. A process according to claim 9, wherein the optionally substituted dicarboxylic acid component includes a compound selected from the group consisting of maleic acid, maleic anhydride, maleic esters, maleic monoesters, maleamide, maleic monoamide, maleic acid ammonium salt and fumaric acid.

13. A process according to claim 9, wherein the catalyst component includes a catalyst selected from the group consisting of phosphoric acid, phosphorous acid, aluminium oxide, methanesulphonic acid, phenylphosphonic acid and phenylphosphonous acid.

14. A process according to claim 9, wherein the amount of catalyst is from 0.01 to 20 g per mole of maleic anhydride.

15. A process according to claim 9, wherein the polymer produced comprises a polysuccinimide having an average molecular weight $M_W$ of from 1600 to 3800.

16. A process according to claim 9, wherein the polymer having repeating succinyl units comprises polyaspartic acid.

* * * * *